United States Patent
Beier et al.

(10) Patent No.: US 12,554,721 B2
(45) Date of Patent: Feb. 17, 2026

(54) QUERY EXECUTION IN A DATA ANALYSIS SYSTEM

(71) Applicant: INTERNATIONAL BUSINESS MACHINES CORPORATION, Armonk, NY (US)

(72) Inventors: Felix Beier, Haigerloch (DE); Reinhold Geiselhart, Rottenburg-Ergenzingen (DE); Luis Eduardo Oliveira Lizardo, Böblingen (DE); Knut Stolze, Hummelshain (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/323,790

(22) Filed: May 25, 2023

(65) Prior Publication Data

US 2024/0370441 A1    Nov. 7, 2024

(30) Foreign Application Priority Data

May 3, 2023 (GB) ..................................... 2306490

(51) Int. Cl.
*G06F 16/2455* (2019.01)
*G06F 16/23* (2019.01)
(Continued)

(52) U.S. Cl.
CPC .... *G06F 16/24561* (2019.01); *G06F 16/2379* (2019.01); *G06F 16/24542* (2019.01); *G06F 16/27* (2019.01)

(58) Field of Classification Search
CPC ............... G06F 16/24561; G06F 16/27; G06F 16/2379; G06F 16/24542; G06F 16/273;
(Continued)

(56) References Cited

U.S. PATENT DOCUMENTS 6,122,640 A * 9/2000 Pereira ................ G06F 16/2282
707/648
10,262,002 B2    4/2019 Brodt
(Continued)

OTHER PUBLICATIONS

Butterstein et al., Article: "Replication at the speed of change: a fast, scalable replication solution for near real-time HTAP processing"; Authors: Dennis Butterstein, Daniel Martin, Knut Stolze, Felix Beier, Jia Zhong, Lingyun Wang. Published: Aug. 1, 2020. VLDB Endowment, vol. 13, Issue 12; (Year: 2020).*

(Continued)

*Primary Examiner* — Evan Aspinwall
(74) *Attorney, Agent, or Firm* — Anthony Curro

(57) ABSTRACT

The present disclosure relates to a method including repeatedly synchronizing a source table with a target table. The synchronizing includes receiving changes of the source table, the changes indicating delete records to be deleted and/or insert records to be inserted, replicating the changes to the target table, storing in a storage device the delete records and the insert records of the changes; and deleting from the storage device the records of the changes that are applied at the target table. A query referencing data of the source table may be received. A first query and a second query may be derived from the received query. The first query may be executed on the target table excluding the records in the storage device. The second query may be executed on the insert records of the storage device. The results of the executions may be provided to a sender of the query.

12 Claims, 6 Drawing Sheets

(51) Int. Cl.
*G06F 16/2453* (2019.01)
*G06F 16/27* (2019.01)

(58) Field of Classification Search
CPC .. G06F 16/2365; G06F 16/275; G06F 16/214; G06F 11/203; G06F 2201/835; G06F 16/215; G06F 16/2322; G06F 16/2358; G06F 11/1402; G06F 11/1662; H04L 67/1095
USPC .......................................................... 707/769
See application file for complete search history.

(56) References Cited

U.S. PATENT DOCUMENTS

| | | | |
|---|---|---|---|
| 11,119,678 B2 | 9/2021 | Barber | |
| 11,176,171 B2 | 11/2021 | Brodt | |
| 11,360,998 B2 | 6/2022 | Hrle | |
| 2006/0161530 A1* | 7/2006 | Biswal | G06F 16/2329 |
| 2009/0083341 A1* | 3/2009 | Parees | G06F 16/2365 |
| 2012/0089566 A1* | 4/2012 | Effern | G06F 16/2379 707/611 |
| 2014/0304229 A1 | 10/2014 | Zhu | |
| 2015/0081637 A1* | 3/2015 | Bourbonnais | G06F 16/273 707/639 |
| 2015/0112923 A1* | 4/2015 | Driesen | G06F 16/2379 707/609 |
| 2015/0213071 A1 | 7/2015 | Alvey | |
| 2016/0196163 A1 | 7/2016 | Van Gulik | |
| 2018/0067962 A1* | 3/2018 | Brodt | G06F 16/2457 |
| 2019/0220468 A1* | 7/2019 | Hrle | G06F 16/273 |
| 2019/0294602 A1* | 9/2019 | Li | G06F 16/215 |
| 2020/0034365 A1* | 1/2020 | Martin | G06F 16/24554 |
| 2020/0151195 A1* | 5/2020 | Brodt | G06F 16/273 |
| 2020/0301947 A1 | 9/2020 | Botev | |
| 2020/0364185 A1* | 11/2020 | Beier | G06F 16/178 |
| 2021/0303597 A1* | 9/2021 | Zhang | G06F 16/275 |
| 2023/0034941 A1* | 2/2023 | Bos | G06F 16/2282 |

OTHER PUBLICATIONS

Butterstein et al., Article: "Replication at the speed of change: a fast, scalable replication solution for near real-time HTAP processing"; Authors: Dennis Butterstein; Info & Claims Proceedings of the VLDB Endowment, vol. 13, Issue 12; pp. 3245-3257; Published: Aug. 1, 2020; (Year: 2020).*
Intellectual Property Office, "Patents Act 1977: Report under Section 17(5)(b)," Oct. 10, 2023, 6 pages, GB Application No. 2306490.0.
Butterstein, et al., "Replication at the Speed of Change—a Fast, Scalable Replication Solution for Near Real-Time HTAP Processing", Proceedings of the VLDB Endowment, vol. 13, No. 12, ACM, 17 Pages. https://dl.acm.org/doi/10.14778/3415478.3415548.
IBM Redbooks, "IBM Integrated Synchronization: Incremental Updates Unleashed", http://www.redbooks.ibm.com/abstracts/redp5616.html?Open, Accessed on May 10, 2023, 11 Pages.
IBM, "IBM Integrated Synchronization", https://www.ibm.com/docs/en/daafz/7.5?topic=updates-integrated-synchronization, Accessed on Sep. 2, 2023, 6 Pages.
IBM, "Including or excluding loaded tables from WAITFORDATA queries", https://www.ibm.com/docs/en/daafz/7.5?topic=updates-including-excluding-loaded-tables-from-waitfordata-queries, Accessed on Sep. 2, 2023, 3 Pages.
Miosoft Corporation, "Using Databases for Both Transactions and Analysis", https://patents.justia.com/patent/20160196163, Accessed on Sep. 2, 2023, pp. 1-44.
Sikka, et al., "Efficient transaction processing in SAP HANA database: the end of a column store myth", Sigmod S12, May 20-24, 2012, ACM, 11 Pages.
Beier, et al., "Query Execution in A Data Analysis System", Application No. 2306490.0, Filed Date May 3, 2023, 36 Pages.

* cited by examiner

QUERY EXECUTION IN A DATA ANALYSIS SYSTEM

BACKGROUND

The present disclosure relates to the field of digital computer systems, and more specifically, to a method for executing a query in a data analysis system.

A hybrid database system seamlessly extends strong transactional capabilities with very fast processing of analytical workloads. The data may be copied from a transactional engine to the analytical engine, and users can tailor data maintenance according to their needs. This copy process, the data load, can be done on a whole table or just a physical table partition. However, this may affect the query execution process.

SUMMARY

Various embodiments provide a method for executing a query in a data analysis system, computer program product and computer system as described by the subject matter of the claims.

In one aspect, presently described embodiments relate to a method for executing a query in a data analysis system, the data analysis system including a source database system and a target database system, the source database system including at least one source table, the target database system including a target table corresponding to the source table, the data analysis system including a replication system configured for replicating changes of the source table to the target table. The method may include: repeatedly synchronizing the source table with the target table, the synchronizing including receiving changes of the source table, the changes indicating records, hereafter delete records of the source table to be deleted and/or records to be inserted, hereafter insert records, replicating using the replication system the changes for a subsequent application of the changes to the target table, storing in a storage device the delete records and the insert records of the changes, deleting from the storage device the records of the changes that are applied at the target table, receiving a query referencing data of the source table, deriving from the received query a first query and a second query such that a combination of results of the first query and the second query provides a result of the received query, causing execution of the first query on the target table excluding the records in the storage device, executing the second query on the insert records of the storage device, and providing results of the executions to a sender of the query.

In one aspect described embodiments relate to a computer program product including a computer-readable storage medium having computer-readable program code embodied therewith, the computer-readable program code configured to implement the method of the above embodiment.

In one aspect the invention relates to a computer program product including one or more computer-readable tangible storage medium and program instructions stored on at least one of the one or more computer-readable tangible storage medium, the program instructions executable by a processor capable of performing a method for executing a query in a data analysis system, the data analysis system including a source database system and a target database system, the source database system including at least one source table, the target database system including a target table corresponding to the source table, the data analysis system including a replication system configured for replicating changes of the source table to the target table, where the method includes: repeatedly synchronizing the source table with the target table, the synchronizing including receiving changes of the source table, the changes indicating records, hereafter delete records, of the source table to be deleted and/or records to be inserted, hereafter insert records, replicating using the replication system the changes for a subsequent application of the changes to the target table, storing in a storage device the delete records and the insert records of the changes, deleting from the storage device the records of the changes that are applied at the target table, receiving a query referencing data of the source table, deriving from the received query a first query and a second query such that results of the first and second queries are results of the received query, causing execution of the first query on the target table excluding the records in the storage device, executing the second query on the insert records of the storage device, and providing results of the executions to a sender of the query.

BRIEF DESCRIPTION OF THE DRAWINGS

In the following, described embodiments of the invention are explained in greater detail, by way of example only, making reference to the drawings in which.

DETAILED DESCRIPTION

Figure 1:
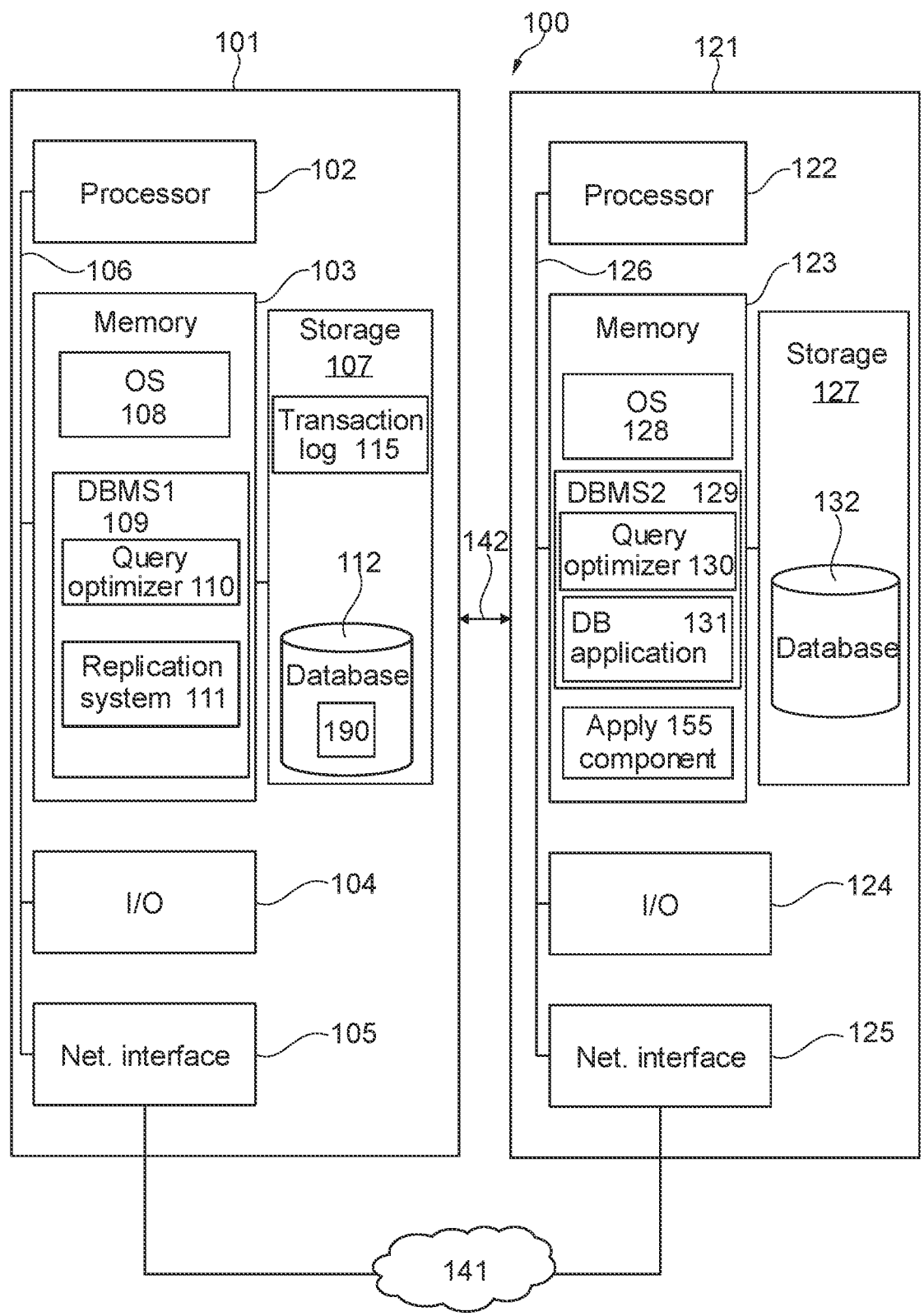
FIG. 1 illustrates a diagram of a data analysis system according to at least one embodiment.

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A 'data analysis system' may include a source database system and a target database system. The data analysis system may, for example, be a data warehousing system or master data management system. The data analysis system may enable data warehousing or master data management or another technique that uses a source and target database systems, wherein the target database system includes a target database that is configured to receive/comprise a copy of a content of a corresponding source database of the source database system. The source database system may, for example, be a transactional engine and the target database system may be an analytical engine. For example, the source database system may be an online transaction processing (OLTP) system and the target database system may be one or more online analytical processing (OLAP) systems. The source database system may include a source dataset and the target database system may include a target dataset. The source dataset may be part of a source database and the target dataset may be part of a target database. The source and target datasets may be stored in a same or different format. The formats may differ in encryption, compression, row-oriented vs. column-oriented storage, etc. For example, the source dataset may be stored in a row-oriented format and the target dataset may be stored in a column-oriented format. In other terms, the target dataset may be stored by column rather than by row. The source dataset may include tables, referred to as source tables, and the target dataset may include corresponding target tables. The content of the source dataset may be changed by one or more database transactions. The data analysis system may be configured to synchronize the content of the source tables of the source database system with the corresponding target tables of the target database system. For example, data may be replicated asynchronously from the source database system to the target database system and each update may be marked with a timestamp from the source database system. Therefore, it may be determined at which point of time the data (e.g., of a given source table) in the target database system is consistent with the source database system.

'Queries' may be executed at the source database system or target database system depending on their type or complexity. For example, a query q may be issued against a source table having a current database state s2. Due to its analytical characteristics, the query together with the database state s2 may be routed by the replication system to the target database system. When query q arrives at the target database system, the database state at the target database system might be an older state of the source table s1. Thus, the target database system may delay query execution until it either hits: 1) a specified wait timeout t, or 2) the target database state reaches at least s2 via the replication system. This may be referred to as wait-for-data feature. If the timeout t is reached before the database state s2, the query execution may be cancelled.

'Synchronization programs' may be used to perform synchronization. The synchronization programs may, for example, include a load program and a replication program. The two programs may differ in the amount and frequency of copying data from a source table to a target table. The load program may copy the whole content of the source table into corresponding target table. The replication program may replicate individual changes from a source table to a corresponding target table by inspecting a transaction log of the source database system. The data change (also referred to as change) that is propagated using the replication program may be referred to as incremental change. The replication program may be executed by a replication system of the data analysis system. The replication system may use recovery log-based replication for replicating the changes. The replication system may, for example, be the Change Replication System. The Change Replication System may be responsible for synchronizing the data state of the target database system with the data state of the source database system. Any changes to the database tables in the source database system may be recorded and propagated to the target database system in order to apply them to the target database tables, too. The replication may include the forwarding or submission of the change followed by the application of the change at the target. That, the application of the change at the target occurs with a time delay with respect to the occurrence time of the change in the source table.

'Source database systems' may include source tables, and the target database may include target tables corresponding to the source tables respectively. The term "table" may refer to a collection of related data held in a structured format. The table consists of attributes (also referred to as columns or fields), and records (or rows). Each record of the table may include values of the attributes and may represent a respective entity. For example, a student table may include attributes such as student ID, student age etc., wherein each record of the table represents an entity being a specific student.

The source database system may be configured to receive one or more changes of each source table of the source tables. The change of the source table may include a deletion of a record of the source table, wherein the deleted record may be referred to as delete record herein. In this case, the change is said to involve a delete record. Alternatively, the change may include an insertion of a record in the source table, wherein the inserted record may be referred to as insert record herein. In this case, the change is said to involve an insert record. Alternatively, the change may include an update of an existing record in the source table, wherein the update may include deletion of said existing record and insertion of its respective updated record. In this case, the change is said to involve a pair of delete record and insert record.

Presently described embodiments may further enhance the synchronization as performed by the replication system. In embodiments, for each received change of the source table, the replication system may replicate the change as described above using the transaction logging. In addition, the insert record and/or delete record involved in each change may be stored in the storage device. If the change is applied at the target database system, the involved insert and/or delete record of the change may be (e.g., automatically) removed from the storage device. The storage device may enable access to the changes that are being replicated but not yet applied at the target database system.

In one example, one storage device may be used to store the records associated with all source tables. This may save resources required to maintain multiple storage devices. Alternatively, the storage device may be provided per source table of the source database system. This may enable an efficient and speedy processing of the queries compared to sharing a same storage device e.g., because with a shared storage, additional selection criteria may be required to identify data related to a given source table among data of all source tables. The storage device may, for example, comprise a buffer having an insertion buffer for storing insert records and a deletion buffer for storing delete records.

Described embodiments may make use of the storage device to efficiently execute the queries. For example, upon receiving a query referencing most recent data of the source table, the received query may be transformed into a first query and a second query. The first query may be referred to herein as target query and the second query may be referred to as delta query. The transformation may be performed such that the combination of the results of the target query and delta query is the results of the received query and such that the target query is to be executed on the target table and the delta query is to be executed on the source table. After creating the target and delta queries, the delta query may be executed against the insert records of the storage device. The target query may however be executed against the target table excluding the records in the storage device. The results of the executions of the two queries may be provided to a sender of the query.

Described embodiments may thus improve the performance of queries that should be executed on a target database system and involve execution on the most recent database state of the source database system. Described embodiments may reduce the total execution time of the query by reducing or avoiding the time required for replication. This may particularly be advantageous as the time for replication may be long in instances involving update-heavy workloads where the source database state may change frequently, or instances in which the amount of data changes may be large in volume due to the data structure. For example, a row may contain structured data which is represented as rather small column values (e.g., numbers, small-sized character strings, etc.) and it may contain unstructured data (e.g., multi-media data, geometric data, etc.) that are rather large in value and require resource intensive (in terms of compute and memory resources) operations for evaluating queries on them (e.g., calculating geometric intersection queries for collision detection). For such large-volume and expensive-to-evaluate data, the target database system may take over query processing tasks from the source database system. For that, a synchronization between the source database system and the target database system may be needed. In particular, the synchronization may involve the transfer of the data changes from the source database system to the target database system. However, the volume of such data changes may be very large and thus the transfer of this data may impact the replication time. The replication time may further depend on performance of the replication system itself. Thus, the total execution time of a query that should be executed by the target database system may depend on the replication time. By implementing presently described embodiments, query execution timeouts due to the wait-for-data scenario may be avoided. By implementing the present method, the target database pattern may be efficiently applied to large-volume and/or expensive to process data types, e.g., geometric or geographic data, by integrating specialized execution engines into the target database system.

The target query may be executed on a consistent view in order to provide reliable and up-to-date results. The consistent view may enable the same records that would be present in the source table if no target table would exist. In order to evaluate the target query on the consistent view, it may be needed to remove outdated records, e.g., records that have already been removed from the source table but whose removal has not been replicated or applied yet, from the target query's view of the target table. These outdated records are provided as delete records in the storage device. Further, future insert records have to be filtered, e.g., future insert records may be insert records that have been inserted into the source table and have already been replicated to the target database system. This consistent view may be enabled according to described embodiments using alternative advantageous techniques.

In some embodiments, executing the target query includes using a snapshot isolation of the storage device at the starting time of execution of the target query. The snapshot isolation may be used in order to exclude the records stored in the storage device. In order to achieve the consistent view over the whole distributed data set that is spread over the buffer in the source database system and the data at the target database system, the buffer may provide snapshot semantics for accessing the buffered records as well. That is, each reading query at the source database system may have an immutable view of all records inside the buffer, which may stay the same as long as the query is running. Newly added or removed records of the buffer may be hidden from this view and physically applying updates may be delayed until the last query referencing the buffered data from a particular snapshot has finished. This snapshot semantics may be implemented by using different advantageous techniques according to described embodiments. In one example, the query may trigger at its reception time the "freezing" of the snapshot/view of the data that was active in all data stores, the buffer as well as the target database system. That is, after query starts, any concurrent data replication activities, which operate on the buffer and the target database system, may be invisible to the query execution on any of the components-irrespective of the order of the query read/change replication operations on each record/row.

In some embodiments, the records involved in the changes are assigned respective logical timestamps. Before executing the target query, a selection criterion excluding the delete records stored in the storage device may be injected at the source database system in the target query before it is sent to the target database system. At the target database system, a selection criterion on the logical timestamps versus the starting time of the target query may be injected in the target query in order to exclude the records (insert records of the storage device) which will be stored in the target table while the target query is running. This example may provide snapshot semantics to a query that is executed on a concurrently modified database state. For example, records may be tagged with logical timestamp values and additional filter predicates may be injected into the target query execution plan to exclude outdated and future rows during processing. The information for filtering future records can be implemented without knowing the actual data values of new records that are present in the source database system, e.g., in the insertion buffer of the buffer, because the query starting time determines which concurrently replicated records are ignored.

The logical timestamps may be assigned to individual buffered or stored records. The replication system may be used to provide these timestamps. For example, Log record sequence numbers (LRSNs) of the corresponding database transaction commit inside the source database system's recovery log may be used to obtain the logical timestamp.

In some embodiments, before executing the target query, described methods may include transmitting to the target database system the target query and information indicating the delete records stored in the storage device. A selection criterion on the logical timestamps versus the starting time of the target query may be injected by the target database system in the target query in order to exclude insert records which will be stored in the target table while the target query is running. In addition, the target database system may insert in the target query a selection criterion to exclude the delete records indicated in the received information. Indeed, the information for filtering outdated rows may have to be transferred from the deletion buffer of the change data buffer of the source database system to the target database system prior to starting the target query because any row in the target database may be subject of a still to-be-replicated deletion. The deleted row information may be queried from the buffer and, for example, be transferred as additional parameter of the target query.

Using the timestamps for excluding the insert records instead of transferring them as information while excluding the delete records using information on the delete records may be advantageous for the following reason. Newly inserted rows or rows whose column value(s) have been updated may be large and thus may require a long time for the transfer from the source to the target database system in order to materialize the new value on the target system. In contrast, synchronizing the deletion of a record can be implemented efficiently by just transferring the information which row has been removed (e.g., by transmitting unique small-sized row ID values).

In some embodiments, illustrative methods may further include assigning, to the changes involving delete records, a priority higher than a priority of the other changes, wherein the replicating of the changes is performed according to the assigned priorities. In this case, the target query may be executed after the delete records have been deleted from the target table and thus there is no need for a selection criterion to exclude them. However, a selection criterion on the logical timestamps versus the starting time of the target query may still be injected in the target query in order to exclude the insert records (future records) which will be stored in the target table while the target query is running.

This example may enable to propagate the record deletion information to the target database via the existing replication system, e.g., by assigning a higher priority to the to-be-replicated deletion part over inserted record part, and the wait-for-data feature can be used to synchronize the change replication with the target query execution. The to-be-replicated row deletion information may be small compared to the insertion part. For example, a to-be-deleted row can be represented by a single row ID number that is simple to transfer. The deletion can be efficiently reflected in the target database, too, in order to create the consistent query view. For example, a row deletion can be instantly applied, e.g., with the help of index structures, to remove the row from the target database. However, this may lead to an inconsistent data state on the target database if the target database state would be considered alone because corresponding inserted rows that may stem from the same source database transaction may still be missing, awaiting asynchronous replication. The consistency of the query view is still guaranteed for the union over the source and target database state if queries are executed as described in this disclosure e.g. the consistency of the query may be guaranteed by the execution of the delta query.

In some embodiments, the receiving of the query further includes determining whether the received query can be transformed into the first query to be executed on the target database system and the second query to be executed on the source database system such that results of the first query and the second query are result of the received query; wherein the deriving, the executing of the target and delta queries and the providing of the results is performed in response to determining that the query can be transformed; wherein in response to determining that the query cannot be transformed the query may be executed on the source database system or offloaded to the target database system.

In some embodiments, the deriving further includes determining a third query for obtaining results of the first and second queries and providing the results to the sender of the query, wherein providing the results includes executing the third query at the source database system. The third query may be referred to as combination query.

On receiving a database query at the source database system, it has to be analysed whether the query can be split into a target, a delta, and a combination query based on the logic that is expressed by the query. For example, evaluations that can be computed on row-level on each individual table row, such as a filter predicate, can simply be the split into a delta and a target part. In this case, the combination query implements the union view over both sub-query results. If the query logic requires aggregation of the information over multiple rows, such a sub-query transformation may be possible if the aggregation can be expressed as combined aggregation over the delta result set and the target result set. For example, calculating the sum or the count of specific values over all rows in the table can be transformed into the sum or count as part of the combination query over the sum/counts over the delta and target result sets. Some other aggregations that do not have this property may be expressed by different aggregations that follow this principle. For example, the average calculation can be split into the aggregations that calculate the count and the sum over delta and target parts and a division operation of both numbers can be implemented as combination query. For aggregations where such a transformation is not possible or beneficial, e.g., because the resulting logic would lead to transferring too much intermediate target result set data, the system may use a fallback execution plan using one of: local execution of the query on the source database system data or offloaded target execution using the wait-for-data feature.

In some embodiments, the replication system is configured to notify the source database system of changes that have been successfully applied to the target database system. Upon receiving this notification, the record(s) involved in these successfully applied changes may be deleted from the storage device. This may enable a seamless integration of described embodiments in the existing data analysis systems. This may also have the advantage of speeding up the update of the storage device compared to using other means for remotely monitoring and checking whether each change is applied at the target database system. An up-to-date content of the storage device may enable to obtain accurate query results.

In another embodiment, a Change Replication System may be extended with a hook which notifies the buffer once all changes of one or more committed transactions have been successfully applied to the target database system in order to purge them from the buffer to minimize the data volume that needs to be processed by delta queries.

In some embodiments, the storage device is a buffer including an insertion buffer and a deletion buffer, wherein the storing includes inserting the delete records in the deletion buffer; inserting the insert records in the insertion buffer, wherein the second query is executed on the insertion buffer. This may speed up the execution of the delta query as there is no need for predicate to select the records to be executed, that is, the delta query may reference (without explicitly naming) all records in the insertion buffer. The buffer may store committed but not yet applied source table rows. The buffer may be implemented as dedicated (in-memory) buffer area as part of the source database system because such a collocated configuration may maximize data access performance for query executions. But other implementations as separate component or as part of the change replication system may be possible. In some embodiments, the storage device is part of the replication system. This may further speed up the process of updating the storage device, wherein and an up-to-date content of the storage device may enable to obtain accurate query results.

In some embodiments, the buffer provides read-only access to the records in the buffer. This may prevent any change of the stored records and thus may prevent inaccurate query results. For query execution, the buffer provides read access to temporarily buffered rows.

For example, changes to the buffer may be applied automatically when database transactions insert or delete rows and the replication system removes buffer entries after having them successfully applied to the target database system.

In some embodiments, each source table of the source database system is associated with a respective storage device (e.g., buffer). This may further speed up the delta query execution as it may not need specific selection of each stored record based on the source table to which they belong.

In some embodiments, the replication by the replication system further includes removing at least part of replicated data from the source table. For example, instead of copying the data from the source database system to the target database system. (parts of) the data of the source database system may be moved to the target database system, removing it from the source database system once it has been transferred. This optimization may, for example, be applied to data columns that are large in volume, are expensive to process on the source database system, or cannot be processed by the source database system because it does not support the corresponding evaluation logic that is supported by the target database system. When applying this optimization, additional resources for managing the moved-to-the-target-system data parts can be saved on the source database system (memory, storage, processing for index maintenance, . . . ). In this case, and in case the query cannot be transformed into the target and delta queries the query may have to be offloaded to the target database system since not all data is present in the source database system because of the above optimization.

FIG. 1 is a block diagram for a data analysis system according to at least one embodiment. The data analysis system 100 may, for example, include an IBM Db2 Analytics Accelerator for z/OS (IDAA). The data analysis system 100 includes a source database system 101 connected to a target database system 121. The source database system 101 may, for example, include IBM Db2 for z/OS. (IBM, DB2, and z/OS are registered trademarks of International Business Machines Corporation in many venues) The target database system 121 may, for example, include IBM Db2 Warehouse (Db2 LUW).

Source database system 101 includes processor 102, memory 103, I/O circuitry 104 and network interface 105 coupled together by bus 106.

Processor 102 may represent one or more processors (e.g., microprocessors). The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

Figure 4:
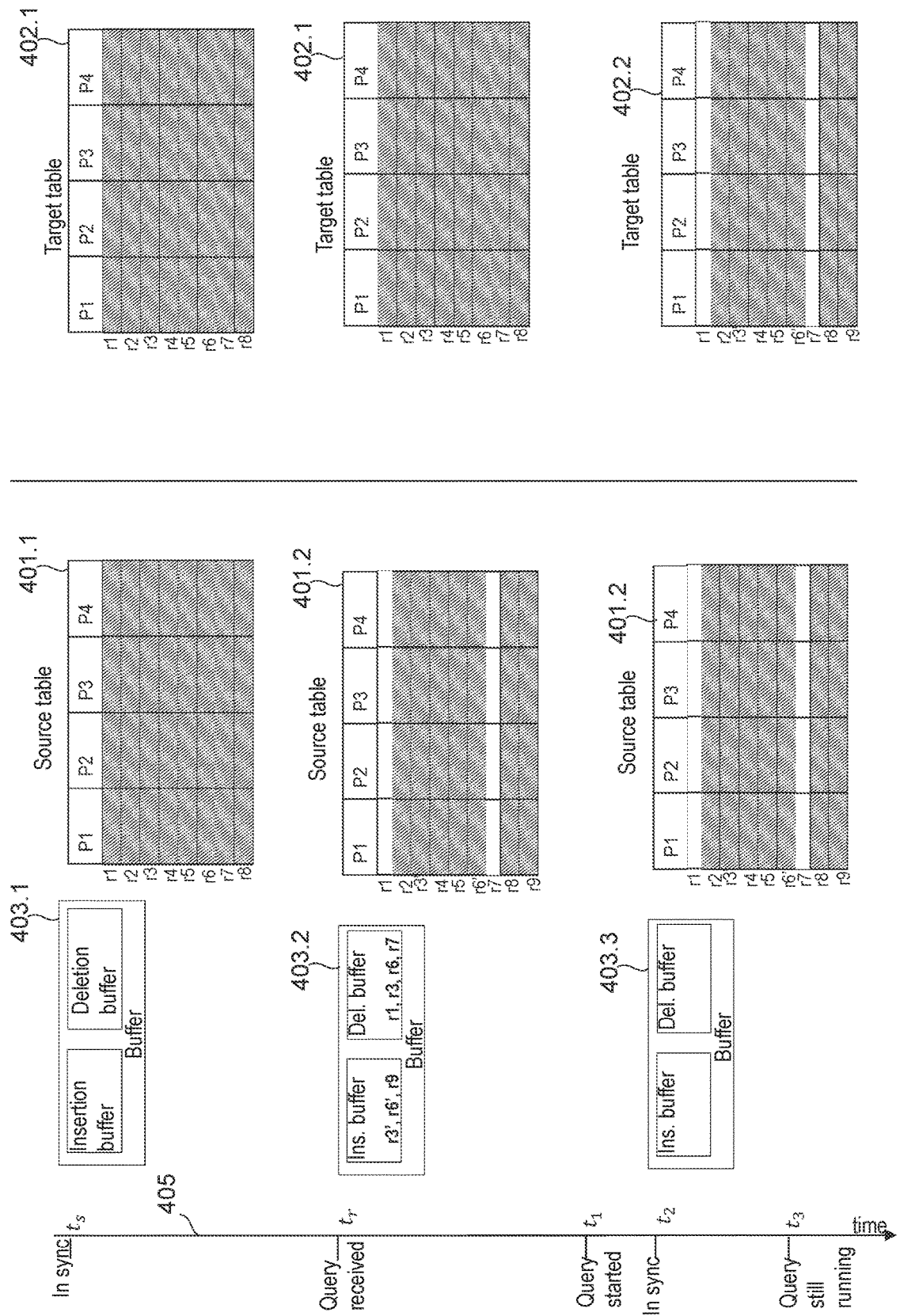
FIG. 4 is a diagram illustrating a method for executing a query in a data analysis system according to at least one embodiment.

Memory 103 in combination with persistent storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like. The storage 107 may include a first database 112. The first database 112 may, for example, comprise one or more first tables 190. FIG. 4 shows an example source table of the tables 190 as stored in the source database system 101.

Memory 103 may include one or more separate programs e.g., database management system DBMS1 109, each of which includes an ordered listing of executable instructions for implementing logical functions, notably functions involved in embodiments of this disclosure. The software in memory 103 shall also typically include a suitable operating system (OS) 108. The OS 108 essentially controls the execution of other computer programs for implementing at least part of methods as described herein. DBMS1 109 includes a replication system 111 and a query optimizer 110. The replication system 111 may include a log reader (not shown). The log reader may read log records (also referred to as log entries) of a transaction recovery log 115 of the source database system 101 and provide changed records to the target database system 121. The transaction recovery log 115 may be referred to as primary source transaction log. The usual content of a log record may include a timestamp, log record sequence number (LRSN) and attribute changes. More specifically, the log records in the transaction recovery log 115 may, for example, contain information defining (1) the table being changed, (2) the value of the key column in the row being changed, (3) the old and new values of all columns of the changed row, and (4) the transaction (unit of work) causing the change. An insert refers to new data record and therefore has no old values. For delete changes, there is no new data record, only an old data record. Thus, log records for inserted rows may contain only new column values while transaction log records for deleted rows may contain only old column values. Log records for updated rows may contain the new and old values of all row columns. The order of log records in the primary source transaction log 115 may reflect the order of change operations of the transactions and the order of transaction commit records may reflect the order in which transactions are completed. The type of row operations in log records can, for example, be delete, insert or update. The log reader may read log records from the recovery log, extract relevant modification or change information (inserts/updates/deletes targeting tables in replication). Extracted information may be transmitted (e.g., as a request for application of the change) to target database system 121. The query optimizer 110 may be configured for generating or defining query plans for executing queries e.g., on first database 112.

Target database system 121 includes processor 122, memory 123, I/O circuitry 124 and network interface 125 coupled together by bus 126.

Processor 122 may represent one or more processors (e.g., microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

Memory 123 in combination with persistent storage device 127 may be used for local data and instruction storage. Storage device 127 includes one or more persistent storage devices and media controlled by I/O circuitry 124. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs e.g., database management system DBMS2 129 and apply component 155, each of which includes an ordered listing of executable instructions for implementing logical functions, notably functions involved in presently described embodiments. The software in memory 123 shall also typically include a suitable OS 128. The OS 128 essentially controls the execution of other computer programs for implementing at least part of methods as described herein. DBMS2 129 includes a DB application 131 and a query optimizer 130. The DB application 131 may be configured for processing data stored in storage device 127. The query optimizer 130 may be configured for generating or defining query plans for executing queries e.g., on a second database 132. The apply component 155 may apply received changes to the second database 132. The apply component 155 may buffer log records sent from the log reader and consolidate the changes into batches to improve efficiency when applying the modifications to the second database 132 via a bulk-load interface. This may enable to perform replication.

Source database system 101 and target database system 121 may be independent computer hardware platforms communicating through a high-speed connection 142 or a network 141 via network interfaces 105, 125. The network 141 may, for example, comprise a local area network (LAN), a general wide area network (WAN), and/or a public network (e.g., the Internet). Each of the source and target database systems 101 and 121 may be responsible for managing its own copies of the data.

Although shown in FIG. 1 as separate systems, the source and target database systems may belong to a single system e.g., sharing a same memory and processor hardware, while each of the source and target database systems is associated with a respective DBMS and datasets e.g., the two DBMSs may be stored in the shared memory. In another example, the two database management systems DBMS1 and DBMS2 may form part of a single DBMS that enables communications and method performed by DBMS1 and DBMS2 as described herein. The first and second datasets may be stored on a same storage or on separate storages.

Figure 2:
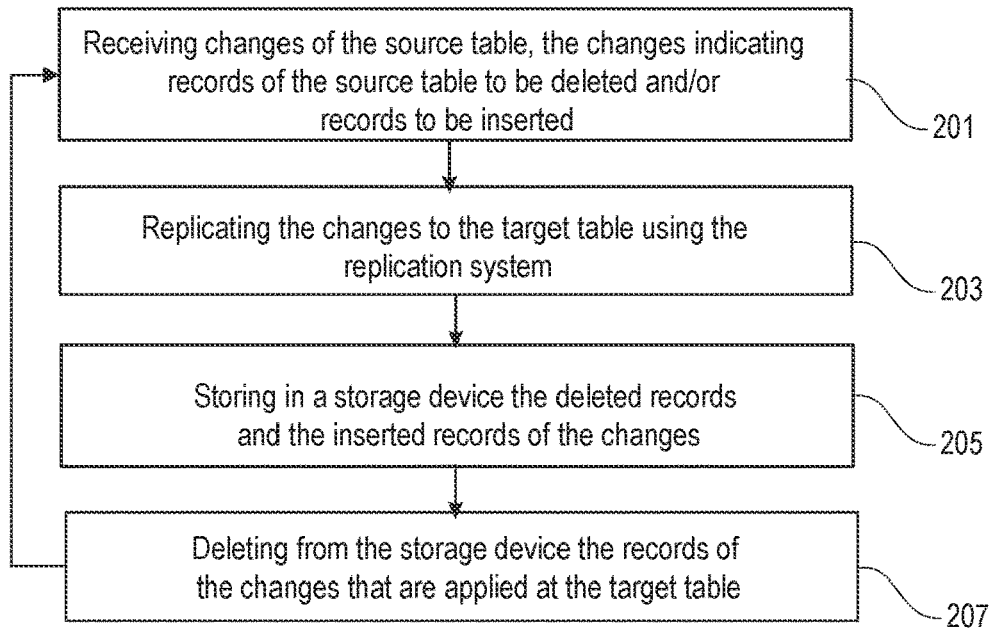
FIG. 2 is a flowchart of an illustrative synchronization method according to at least one embodiment.

FIG. 2 is a flowchart of a synchronization method according to at least one embodiment. For the purpose of explanation, the method described in FIG. 2 may be implemented in the system illustrated in FIG. 1, but is not limited to this implementation. For example, the method of FIG. 2 may be performed by the source database system 101.

One or more changes of the source table (Ts1) may be received in step 201. The changes involve or indicate delete records of the source table Ts1 to be deleted and/or insert records to be inserted. The changes may be replicated using the replication system in step 203 to the target table (Tg1) that corresponds to the source table Ts1. This replication may for example be performed using the transaction log. The delete records and/or the insert records involved in the changes may be stored in step 205 in a storage device associated with the source table Ts1. In case a change of the replicated changes is applied at the target table Tg1, the records involved in the change may be deleted in step 207 from the storage device.

In one example, the method steps 201 to 207 may be repeated for each further received change of the source table Ts1. In one example, the method may be repeated for each further source table Tsi and associated target table Tgi.

Figure 3:
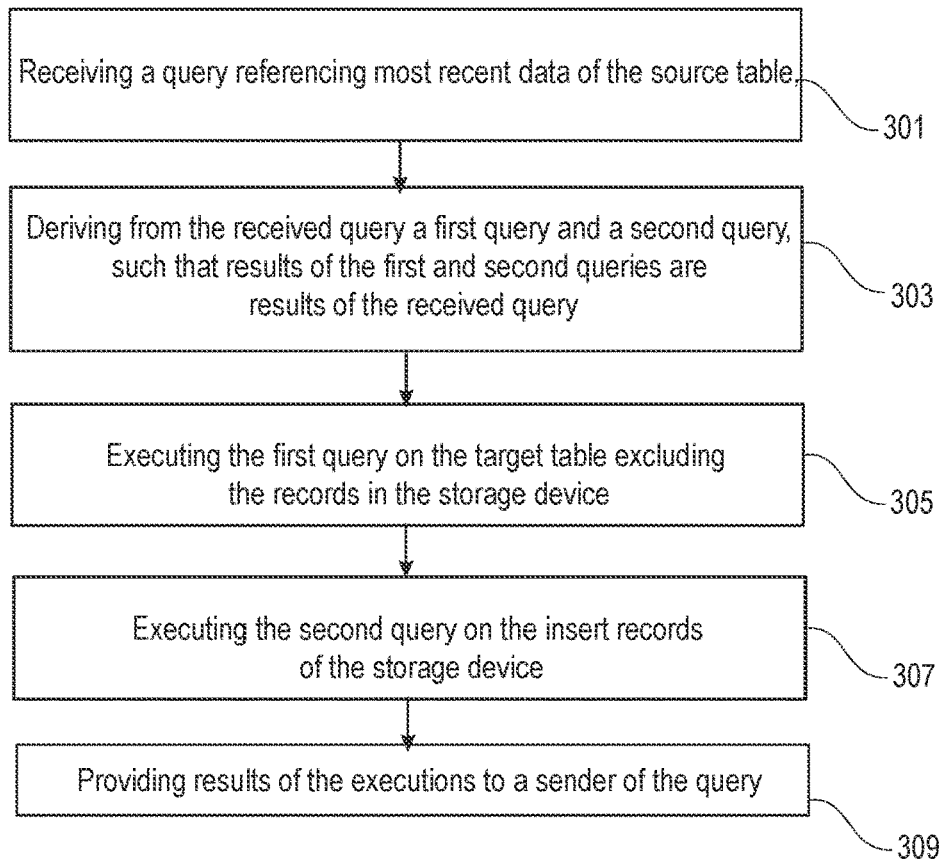
FIG. 3 is a flowchart of a method for executing a query in a data analysis system according to at least one embodiment.

FIG. 3 is a flowchart of a method for executing a query according to at least one embodiment. For the purpose of explanation, the method described in FIG. 3 may be implemented in the system illustrated in FIG. 1, but is not limited to this implementation. For example, the method of FIG. 3 may be performed by the source database system 101. The method of FIG. 3 may be executed concurrently with or after execution of the method of FIG. 2.

A query referencing most recent data of the source table Ts1 may be received in step 301. A first query and a second query may be derived in step 303 from the received query. The first query and second query may be derived such that results of the first and second queries are results of the received query. In addition, the first query and second query may be derived such that they may be executed on the target database system and the source database system respectively. The target database system may be controlled or caused to execute in step 305 the first query on the target table Tg1 excluding the records in the storage device. The second query may be executed in step 307 on the insert records of the storage device. Results of the execution of the first and second queries may be provided in step 309 to a sender of the query.

FIG. 4 is a diagram illustrating a method for executing a query in a data analysis system according to at least one embodiment. FIG. 4 shows a timeline 405 for indicating the evolution over time of the present system. In this example, at an initial time $t_s$, the source database system of the data analysis system includes a source table 401.1 and the target database system of the data analysis system includes a corresponding target table 402.1, wherein the two tables are synchronized; that is, the target table includes a copy of the data of the source table 401.1. As shown, the source table 401.1 includes eight records r1 to r8, each record having values of the attributes P1, P2, P3 and P4. FIG. 4 further shows the buffer 403.1 associated with the source table 401.1. At the point of time $t_s$, the buffer 403.1 is empty since the source table 401.1 is synchronized with the target table 402.1.

A query referencing the most recent data of the source table 401.1 may be received at a later point of time $t_r$. At this point of time the source table 402.2 has a different content than the source table 401.1 at time $t_s$. This is because changes have been occurred during the time period between $t_s$ and $t_r$. As indicated in FIG. 4, these changes comprise the deletion of records r1 and r7, the update of records r3 and r6 and the insertion of a new record r9. The deletion changes involve the delete records r1 and r7. The update changes involve the delete records r3 and r6 and the corresponding insert records r3' and r6'. The insertion change involves an insert record r9. Thus, according to described embodiments, the insert records r3', r6' and r9 are inserted in the insertion buffer of the buffer 403.2 and the delete records r1, r3, r6 and r7 are inserted in the deletion buffer of the buffer 403.2.

During the time between $t_s$ and $t_r$ the changes are replicated to the target database system but are not yet applied. This is indicated in FIG. 4, where at the reception time of the query $t_r$, the target table 402.1 did not change. This means that it is not synchronized with the current source table 401.2. Thus, the received query may be transformed according to described embodiments to a target query and a delta query. The target query may be executed against the target table 402.1 without the records r1, r3, r6, r7, r3', r6' and r9 which are currently stored in the buffer. The delta query may be executed on the insert records r3'. r6' and r9.

At time $t_1$, the execution of the target query may start at the target database system. After that, the changes may all have been applied at time $t_2$ to the target table 402.1. This results in the target table 402.2 which is synchronized with the source table 402.2. The changes which are applied to the target table are notified to the buffer which will then update the buffer by removing all records involved in the applied changes. This may result in the empty buffer 403.3 as indicated in FIG. 4.

At a later point of time $t_3$ the target query may still be running. However, during execution of the target query, the source table 402.2 may change e.g., by adding a new record r10. And this change may be applied to the target table 402.2 while the query is still running. Described embodiments may prevent running the target query on the record r10 at the target database system by, for example, using a snapshot isolation of the buffer at the starting time $t_1$ of execution of the target query.

Figure 5:
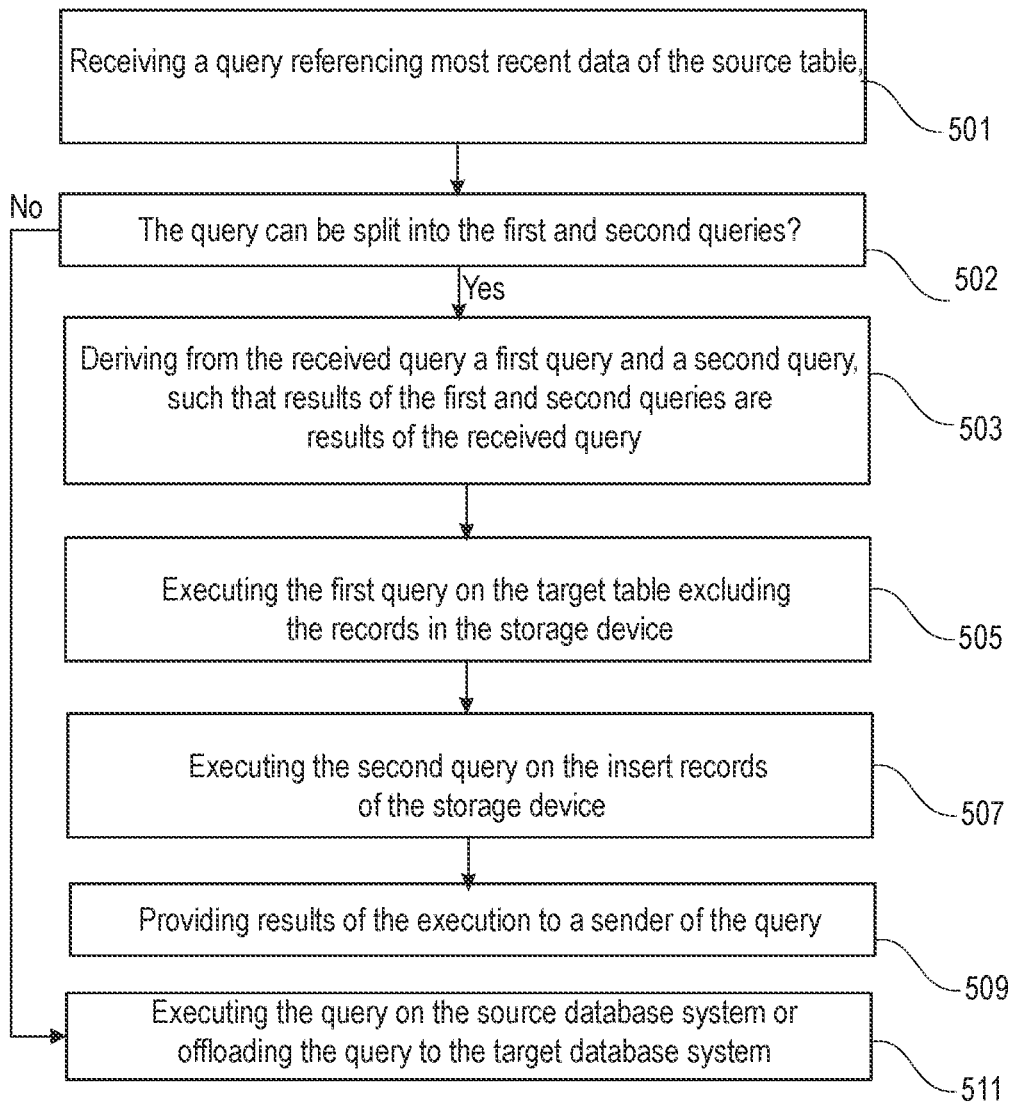
FIG. 5 is a flowchart of a method for executing a query in a data analysis system according to at least one embodiment.

FIG. 5 is a flowchart of a method for executing a query according to at least one embodiment. For the purpose of explanation, the method described in FIG. 5 may be implemented in the system illustrated in FIG. 1, but is not limited to this implementation. For example, the method of FIG. 5 may be performed by the source database system 101.

A query referencing most recent data of the source table Ts1 may be received in step 501. It may be determined in step 502 whether the query can be transformed into two separated queries that can be executed on data of the source database and target database system respectively and whose results are the results of the (single) received query. In case the query can be transformed steps 503 to 509 may be performed; otherwise, step 511 may be performed.

A first query and a second query may be derived in step 503 from the received query. The first query and a second query may be derived such that results of the first and second queries are results of the received query. In addition, the first query and a second query may be derived such that they may be executed on the target database system and the source database system respectively. The target database system may be controlled or caused to execute in step 505 the first query on the target table Tg1 excluding the records in the storage device. The second query may be executed in step 507 on the insert records of the storage device. Results of the execution of the first and second queries may be provided in step 509 to a sender of the query. The received query may be executed in step 511 in the source database system or offloaded to the target database system.

Figure 6:
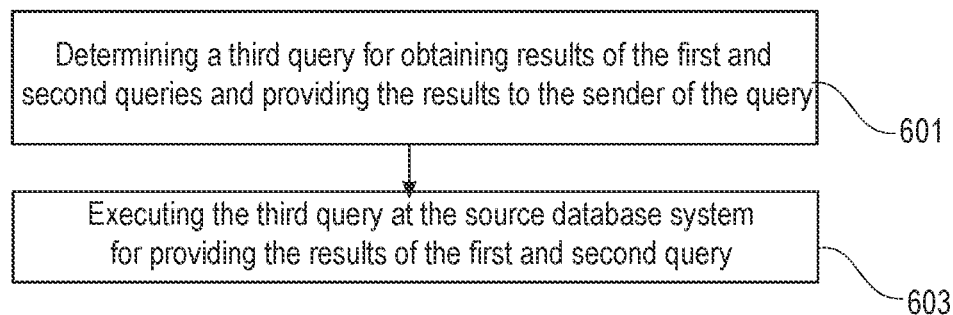
FIG. 6 is a flowchart of a method for executing a query in a data analysis system according to at least one embodiment.

FIG. 6 is a flowchart of a method for executing a query according to at least one embodiment. For the purpose of explanation, the method described in FIG. 6 may be implemented in the system illustrated in FIG. 1, but is not limited to this implementation. For example, the method of FIG. 6 may provide an example implementation of steps 303 and 305.

A third query may be determined in step 601 for obtaining results of the first and second queries (derived in step 303) and providing the results to the sender of the query. The third query may be executed at the source database system in step 603 for obtaining the results of the first and second queries and for providing the obtained results to the sender of the query.

Figure 7:
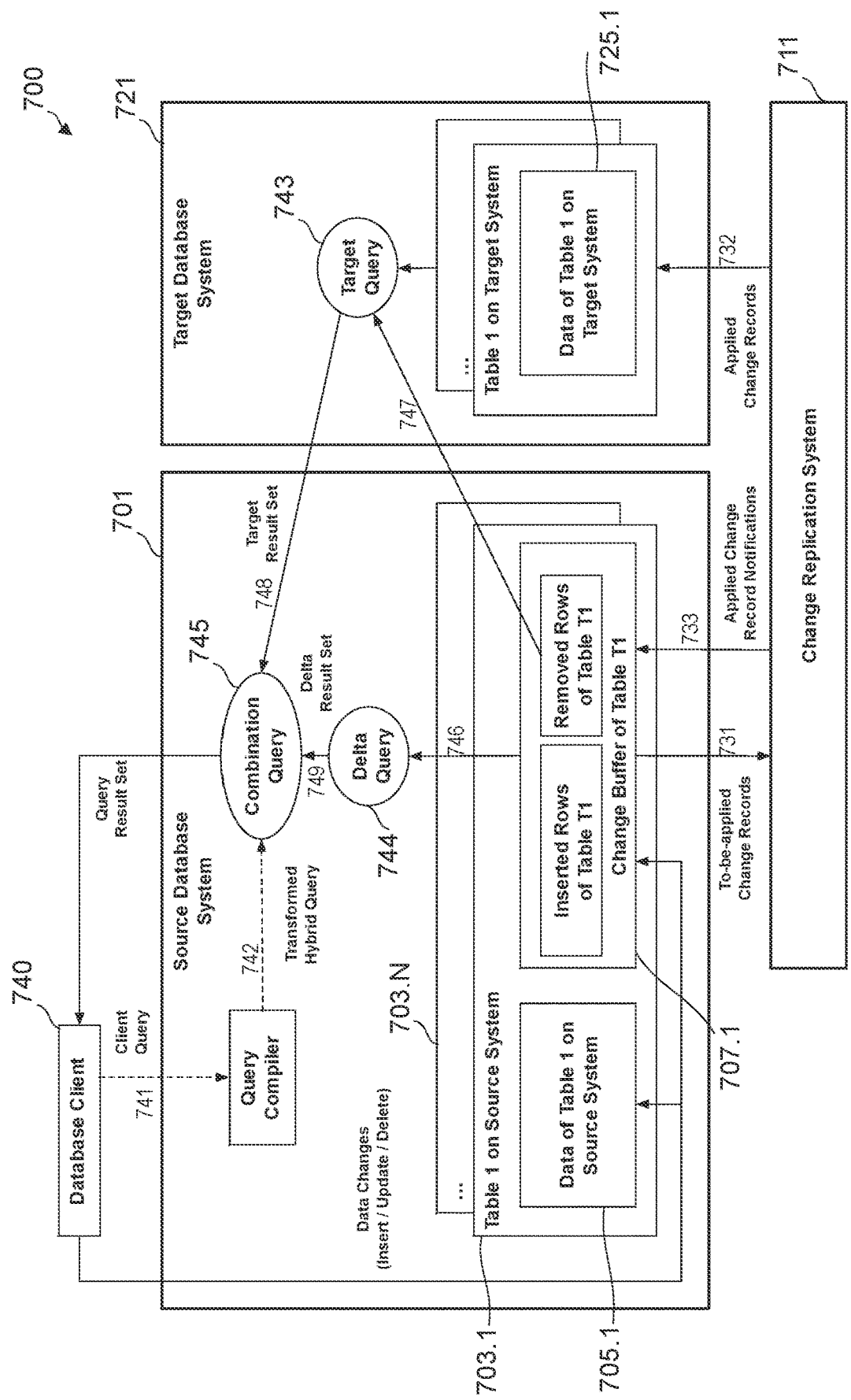
FIG. 7 is a diagram of a data analysis system illustrating a method for executing a query according to at least one embodiment.

FIG. 7 is a diagram of a data analysis system illustrating a method for executing a query according to at least one embodiment. The data analysis system 700 includes a source database system 701 and a target database system 721. The source database system 701 includes a set of table systems 703.1 through 703.N. The set of table systems 703.1 through 703.N includes source tables 705.1 respectively. The set of table systems 703.1 through 703.N further includes change buffers 707.1 respectively. Each change buffer is associated with a respective source table of the same set table system. Each change buffer includes an insertion buffer for storing insert records or rows of the corresponding source table. Each change buffer includes a deletion buffer for storing delete records or rows of the corresponding source table. The target database system 721 includes at least one target table 725.1 associated with at least one source table 705.1 respectively. The data analysis system 700 further includes a change replication system 711. The operation of the data analysis system 700 may be described as follows.

Upon receiving a committed data change, the change may be recorded in a change buffer of the source table that is changed by the data change. This may be performed by separately recording insertion of new row values in the insertion buffer and deletion of old values in the deletion buffer. Upon recording the change in the change buffer, the change may be asynchronously replicated (731) from the change buffer to the target database system 721 via the change replication system 711. In response to applying (732) the change to the target database system 721, the change buffer may be notified (733) about this and may thus remove the change from the change buffer.

Upon receiving (741) a query that evaluates the most recent state of the data on the source database system 701, a view may be created on the target database system data. The view may filter rows which have been (marked as) deleted in the deletion buffer at the point in time when the query has been received. The query may be transformed (742) into three sub-queries: a target query 743, a delta query 744, and a combination query 745. The target query 743 may be scheduled (747) to the target database system 721 where it is executed on the created view. The delta query 744 may be scheduled (746) to the change buffer where it is executed on the most recent data changes that have not been replicated to the target database system 721 yet. The target and delta result sets may be received (748, 749) via the combination query 745 which prepares the final query result that should be returned to the database client 740 that submitted the query (the result matches the execution of the same query on the source database state). If the query cannot be transformed into the sub-queries in step 742, e.g., because the data evaluation logic cannot be split into independent evaluation steps of a delta, a target, and a combination part, the query may be executed with a fallback execution plan, using one of: local execution of the query on the source database system data or offloaded target execution using the wait-for-data feature.

The present subject matter may include the following clauses.

Clause 1. A method for executing a query in a data analysis system, the data analysis system comprising a source database system and a target database system, the source database system comprising at least one source table, the target database system comprising a target table corresponding to the source table, the data analysis system comprising a replication system configured for replicating changes of the source table to the target table, the method comprising: repeatedly synchronizing the source table with the target table, the synchronizing comprising: receiving changes of the source table, the changes indicating records, hereafter delete records, of the source table to be deleted and/or records to be inserted, hereafter insert records; replicating using the replication system the changes for a subsequent application of the changes to the target table;

storing in a storage device the delete records and the insert records of the changes; and deleting from the storage device the records of the changes that are applied at the target table; receiving a query referencing data of the source table; deriving from the received query a first query and a second query such that results of the first and second queries are results of the received query causing execution of the first query on the target table excluding the records in the storage device; executing the second query on the insert records of the storage device; providing results of the executions to a sender of the query.

Clause 2. The method of clause 1, wherein executing the first query comprises using a snapshot isolation of the storage device at the starting time of execution of the first query in order to exclude the records in the storage device.

Clause 3. The method of any of the preceding clauses 1 to 2, wherein the records indicated in the changes are assigned respective logical timestamps, the method further comprising before executing the first query: injecting at the source database system in the first query a selection criterion excluding the delete records stored in the storage device; injecting at the target database system in the first query a selection criterion on the logical timestamps and a starting time of execution of the first query in order to exclude records that will be stored in the target table while the first query is running.

Clause 4. The method of any of the preceding clauses 1 to 2, wherein the records indicated in the changes are assigned respective logical timestamps, the method further comprising before executing the first query: transmitting to the target database system the first query and information indicating the delete records stored in the storage device; injecting at the target database system in the first query a selection criterion on the logical timestamps and a starting time of execution of the first query in order to exclude records that will be stored in the target table while the first query is running and a selection criterion to exclude the delete records indicated in the received information.

Clause 5. The method of any of the preceding clauses 1 to 2, further comprising: assigning to the changes involving delete records a priority higher than a priority of the other changes, wherein the replicating is performed according to the assigned priorities; injecting at the target database system in the first query a selection criterion on the logical timestamps and the starting time of the first query in order to exclude records that will be stored in the target table while the first query is running; executing the first query after the delete records have been deleted from the target table.

Clause 6. The method of any of the preceding clauses 1 to 5, the storage device being a buffer having an insertion buffer and a deletion buffer, wherein the storing comprises: inserting the delete records in the deletion buffer; inserting the insert records in the insertion buffer; wherein the second query is executed on the insertion buffer.

Clause 7. The method of clause 6, the buffer providing read only access to the records in the buffer.

Clause 8. The method of any of the preceding clauses 1 to 7, the receiving of the query further comprising: determining whether the first and second queries can be derived from the received query, wherein the first query is to be executed on the target database system and the second query is to be executed on the source database system such that results of the first query and the second query are result of the received query; wherein the deriving, the executing and the providing is performed in response to determining that the first and second queries can be derived from the received query; wherein in response to determining that the first and second queries cannot be derived from the received query executing the received query on the source database system or off-loading the query to the target database system.

Clause 9. The method of any of the preceding clauses 1 to 8, the deriving further comprising: determining using the first and second queries a third query for performing a combination of the results; wherein providing the results comprises executing the third query at the source database system.

Clause 10. The method of any of the preceding clauses 1 to 9, the replication system being configured to notify changes that have been successfully applied to the target database system, wherein the deletion of the stored records is performed in response to the notification.

Clause 11. The method of any of the preceding clauses 1 to 10, the storage device being part of the replication system.

Clause 12. The method of any of the preceding clauses 1 to 11, wherein the replicating comprises removing at least part of replicated data from the source table.

Figure 8:
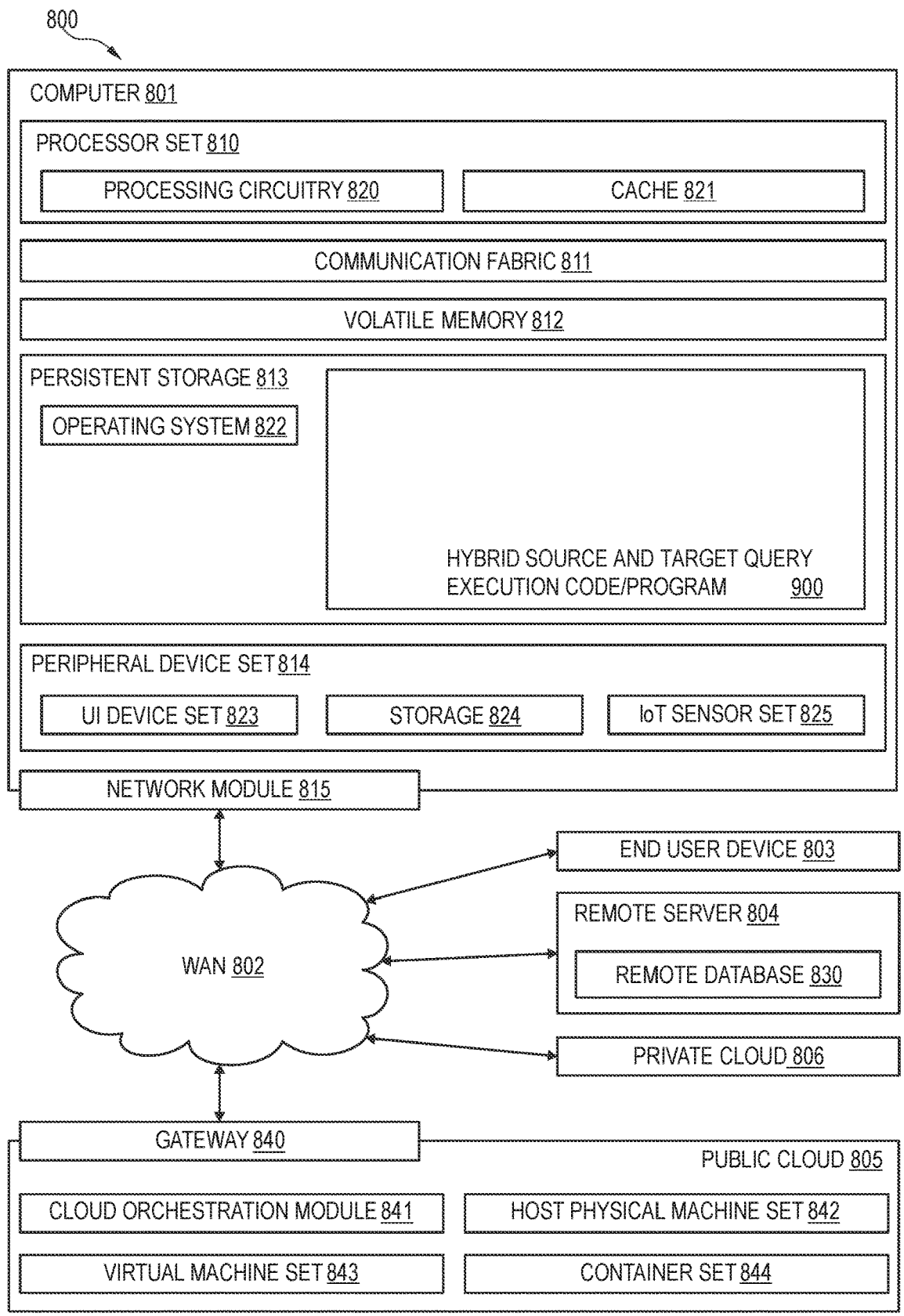
FIG. 8 is a computing environment according to at least one embodiment.

FIG. 8 depicts a computing environment according to at least one embodiment Computing environment 800 contains an example of an environment for the execution of at least some of the computer code involved in performing described embodiments, such as hybrid source and target query execution code 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It may be appreciated that FIG. 2 provides only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for executing a query in a data analysis system, the data analysis system comprising a source database system and a target database system, the target database system being synchronized with the source database system, the source database system comprising at least one source table, the target database system comprising a target table corresponding to the source table, the target table of the target database system an older version of the source table, the data analysis system comprising a replication system associated with a synchronization program configured for replicating changes associated with the source table to the target table, the method comprising:
   repeatedly synchronizing the source table with the target table using a synchronization program, the synchronizing by the synchronization program including:
      receiving by the synchronization program changes associated with the source table, the changes indicating records including delete records of the source table to be deleted and insert records to be inserted into the source table;
      replicating by the synchronization program using the replication system the changes for a subsequent application of the changes to the target table;
      storing by the synchronization program the delete records and the insert records of the changes; and
      deleting by the synchronization program the records of the changes that are applied at the target table after a change replication system notifies a buffer of one or more committed transactions that have been successfully applied to the target database system in order to purge them from the buffer;
   receiving a query referencing data of the source table, the delete records already removed from the source table but not yet removed from the target table and the insert records already inserted into the source table but not yet inserted into the target table;
   transforming the received query into a target query and a delta query, the transformation performed such that the combination of the results of the target query and the delta query are results of the received query and the results of the received query referencing data of the source table are up-to-date;
   causing execution of the target query derived from the received query on the target table excluding the delete records and insert records of the changes;
   executing the delta query derived from the received query on the insert records of the source table; and
   providing results of the executions of the target query and the delta query to a sender of the query, the results of execution of the target query and the delta query reflecting most recent data available responsive to the query in the source database and target database.

2. The method of claim 1, wherein the first target query is executed using a snapshot isolation at a starting time of execution of the first query to exclude insert and delete records.

3. The method of claim 1, wherein records indicated in the changes are assigned respective logical timestamps, the method further comprising:
   before executing the first target query, injecting at the source database system in the first target query a first selection criterion excluding the delete records stored; and
   injecting at the target database system in the target query, a second selection criterion on the logical timestamps and the starting time of execution of the target query to exclude records that will be stored in the target table while the first query is running.

4. The method of claim 1, further comprising:
   before executing the target query, transmitting to the target database system the target query and information indicating the delete records stored;
   injecting at the target database system in the target query a first selection criterion on the logical timestamps and the starting time of execution of the target query to exclude records that will be stored in the target table while the target query is running, and a second selection criterion to exclude the delete records indicated in the received information.

5. The method of claim 1, further comprising:
   assigning to changes involving the delete records a first priority higher than a second priority assigned to a series of other changes, wherein the replicating is performed according to the assigned first and second priorities;
   injecting at the target database system in the target query a selection criterion on logical timestamps of records and the starting time of the target query in order to exclude the records that will be stored in the target table while the target query is running; and
   executing the target query after the delete records have been deleted from the target table.

6. The method of claim 1, the receiving of the query further comprising:
   determining whether the target and second delta queries can be derived from the received query, wherein the target query is to be executed on the target database system and the delta query is to be executed on the source database system wherein results of the target query and the delta query are result of the received query;
   wherein the deriving, the executing and the providing is performed in response to determining that the target and delta queries can be derived from the received query; and
   wherein in response to determining that the target and delta queries cannot be derived from the received query executing the received query on the source database system or offloading the query to the target database system.

7. The method of claim 1, the deriving further comprising:
   determining using the target and delta queries a combination query for performing a combination of the results; and
   wherein providing the results further comprises executing the combination query at the source database system.

8. The method of claim 1, the replication system being configured to notify changes that have been successfully applied to the target database system, wherein the deletion of the stored records is performed in response to the notified changes.

9. The method of claim 1, wherein the replicating comprises removing at least part of replicated data from the source table.

10. A computer program product, the computer program product comprising:
one or more computer-readable tangible storage medium and program instructions stored on at least one of the one or more computer-readable tangible storage medium, the program instructions executable by a processor capable of performing a method for executing a query in a data analysis system, the data analysis system comprising a source database system and a target database system being synchronized with the source database system, the source database system comprising at least one source table, the target database system comprising a target table corresponding to the source table, the target table an older version of the source table, the data analysis system comprising a replication system associated with a synchronization program configured for replicating changes of the source table to the target table, the method comprising:
repeatedly synchronizing the source table with the target table using a synchronization program, the synchronizing by the synchronization program including:
receiving by the synchronization program changes associated with the source table, the changes indicating records including delete records of the source table to be deleted and insert records to be inserted into the source table;
replicating by the synchronization program using the replication system the changes for a subsequent application of the changes to the target table;
storing by the synchronization program the delete records and the insert records of the changes; and
deleting by the synchronization program the records of the changes that are applied at the target table after a change replication system notifies a buffer of one or more committed transactions that have been successfully applied to the target database system in order to purge them from the buffer;
receiving a query referencing data of the source table, the delete records already removed from the source table but not yet removed from the target table and the insert records already inserted into the source table but not yet inserted into the target table;
deriving from the received query a target query and a delta query wherein results of the target and delta queries are results of the received query and the results of the received query referencing data of the source table are up-to-date;
causing execution of the delta query derived from the received query on the target table excluding the delete records and insert records of the changes;
executing the delta query derived from the received query on the insert records of the source table; and
providing results of the executions of the target query and the delta query to a sender of the query, the results of execution reflecting most recent data available in the source database and target database.

11. A computer system for executing a query in a data analysis system, the data analysis system comprising a source database system and a target database system being synchronized with the source database system, the source database system comprising at least one source table, the target database system comprising a target table corresponding to the source table, the target table an older version of the source table, the data analysis system comprising a replication system associated with a synchronization program configured for replicating changes of the source table to the target table, the computer system being configured for performing a method, the method comprising:
repeatedly synchronizing the source table with the target table using a synchronization program, the synchronizing by the synchronization program including:
receiving by the synchronization program changes associated with the source table, the changes indicating records including delete records of the source table to be deleted and insert records to be inserted into the source table;
replicating by the synchronization program using the replication system the changes for a subsequent application of the changes to the target table;
storing by the synchronization program the delete records and the insert records of the changes; and
deleting by the synchronization program the records of the changes that are applied at the target table after a change replication system notifies a buffer of one or more committed transactions that have been successfully applied to the target database system in order to purge them from the buffer;
receiving a query referencing data of the source table, the delete records already removed from the source table but not yet removed from the target table and the insert records already inserted into the source table but not yet inserted into the target table;
deriving from the received query a target query and a delta query wherein results of the target and delta queries are results of the received query and the results of the received query referencing data of the source table are up-to-date;
causing execution of the target query derived from the received query on the target table excluding the delete records and insert records of the changes;
executing the delta query derived from the received query on the insert records of the source table; and
providing results of the executions of the target query and the delta query to a sender of the query, the results of execution reflecting most recent data available in the source database and target database.

12. The computer system of claim 11, being configured for executing the target query by using a snapshot isolation at the starting time of execution of the target query in order to exclude insert and delete records.

* * * * *